(12) United States Patent
Jha et al.

(10) Patent No.: US 9,906,981 B2
(45) Date of Patent: Feb. 27, 2018

(54) METHOD AND SYSTEM FOR DYNAMIC REGULATION AND CONTROL OF WI-FI SCANS

(71) Applicant: NVIDIA Corporation, Santa Clara, CA (US)

(72) Inventors: Ashu Jha, Sunnyvale, CA (US); Michael Hsu, San Jose, CA (US); Srinivas Ramachandran, Santa Clara, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 15/053,406

(22) Filed: Feb. 25, 2016

(65) Prior Publication Data

US 2017/0251400 A1    Aug. 31, 2017

(51) Int. Cl.
| | | |
|---|---|---|
| *H04W 72/00* | (2009.01) | |
| *H04W 28/06* | (2009.01) | |
| *H04W 64/00* | (2009.01) | |
| *H04W 48/16* | (2009.01) | |
| *H04W 84/12* | (2009.01) | |
| *H04W 48/20* | (2009.01) | |

(52) U.S. Cl.
CPC ............ *H04W 28/06* (2013.01); *H04W 48/16* (2013.01); *H04W 64/00* (2013.01); *H04W 48/20* (2013.01); *H04W 84/12* (2013.01)

(58) Field of Classification Search
CPC ..... H04W 48/16; H04W 16/14; H04W 8/005; H04W 74/002; H04W 88/08; H04W 28/18; H04W 36/30; H04W 4/02
USPC ....... 455/434, 509, 41.2; 370/331, 338, 328, 370/329, 333, 332
See application file for complete search history.

(56) References Cited

U.S. PATENT DOCUMENTS

| | | |
|---|---|---|
| 4,864,629 A | 9/1989 | Deering |
| 5,430,464 A | 7/1995 | Lumelsky |
| 5,483,254 A | 1/1996 | Powell |
| 5,500,939 A | 3/1996 | Kurihara |
| 5,577,981 A | 11/1996 | Jarvik |
| 5,841,447 A | 11/1998 | Drews |
| 5,886,701 A | 3/1999 | Chauvin et al. |
| 5,913,727 A | 6/1999 | Ahdoot |
| 5,949,428 A | 9/1999 | Toelle et al. |
| 6,016,474 A | 1/2000 | Kim et al. |
| 6,057,855 A | 5/2000 | Barkans |

(Continued)

FOREIGN PATENT DOCUMENTS

| | | |
|---|---|---|
| CN | 101420618 | 4/2009 |
| CN | 101945287 | 1/2011 |

(Continued)

OTHER PUBLICATIONS

Parhami, Computer Arithmetic, Oxford University Press, Jun. 2000, pp. 413-418.

(Continued)

*Primary Examiner* — Joseph Arevalo

(57) ABSTRACT

A method for discovering wireless access. The method includes launching an application in association with a first device. A Wi-Fi scan policy is accessed, wherein the scan policy is associated with the application. The method includes setting parameters for implementing a plurality of Wi-Fi scans from the first device based on said Wi-Fi scan policy.

18 Claims, 10 Drawing Sheets

(56) References Cited

U.S. PATENT DOCUMENTS

| | | | |
|---|---|---|---|
| 6,064,354 A | 5/2000 | DeLuca | |
| 6,141,740 A | 10/2000 | Mahalingaiah et al. | |
| 6,243,054 B1 | 6/2001 | DeLuca | |
| 6,278,418 B1 | 8/2001 | Doi | |
| 6,281,903 B1 | 8/2001 | Martin et al. | |
| 6,308,565 B1 | 10/2001 | French et al. | |
| 6,314,493 B1 | 11/2001 | Luick | |
| 6,438,664 B1 | 8/2002 | McGrath et al. | |
| 6,476,807 B1 | 11/2002 | Duluk, Jr. et al. | |
| 6,492,991 B1 | 12/2002 | Morein et al. | |
| 6,496,193 B1 | 12/2002 | Surti et al. | |
| 6,525,725 B1 | 2/2003 | Deering | |
| 6,545,683 B1 | 4/2003 | Williams | |
| 6,559,813 B1 | 5/2003 | DeLuca et al. | |
| 6,611,253 B1 | 8/2003 | Cohen | |
| 6,690,381 B1 | 2/2004 | Hussain et al. | |
| 6,750,870 B2 | 6/2004 | Olarig | |
| 6,825,847 B1 | 11/2004 | Molnar et al. | |
| 6,839,062 B2 | 1/2005 | Aronson et al. | |
| 6,891,543 B2 | 5/2005 | Wyatt | |
| 6,951,515 B2 | 10/2005 | Ohshima et al. | |
| 7,015,909 B1 | 3/2006 | Morgan, III et al. | |
| 7,072,477 B1 | 7/2006 | Kincaid | |
| 7,170,515 B1 | 1/2007 | Zhu | |
| 7,203,356 B2 | 4/2007 | Gokturk et al. | |
| 7,218,291 B2 | 5/2007 | Abdalla et al. | |
| 7,308,115 B2 | 12/2007 | Zhang et al. | |
| 7,324,594 B2 | 1/2008 | Lamboray et al. | |
| 7,370,016 B1 | 5/2008 | Hunter et al. | |
| 7,463,270 B2 | 12/2008 | Vale et al. | |
| 7,486,290 B1 | 2/2009 | Kilgariff et al. | |
| 7,616,202 B1 | 11/2009 | Chen et al. | |
| 7,692,659 B1 | 4/2010 | Molnar et al. | |
| 7,719,563 B2 | 5/2010 | Richards | |
| 7,839,803 B1 | 11/2010 | Snelgrove et al. | |
| 7,856,147 B2 | 12/2010 | Srinidhi | |
| 7,925,067 B2 | 4/2011 | Bacus et al. | |
| 8,019,449 B2 | 9/2011 | Barzegar et al. | |
| 8,024,768 B2 | 9/2011 | Berger et al. | |
| 8,279,168 B2 | 10/2012 | Glomski et al. | |
| 8,363,969 B1 | 1/2013 | Wang et al. | |
| 8,375,301 B2 | 2/2013 | Nuyttens et al. | |
| 8,411,966 B2 | 4/2013 | Zhang et al. | |
| 8,610,707 B2 | 12/2013 | Chen | |
| 8,750,242 B2 * | 6/2014 | Forte | H04W 36/0011 370/331 |
| 9,002,125 B2 | 4/2015 | Schneider et al. | |
| 2001/0038642 A1 | 11/2001 | Alvarez, II et al. | |
| 2001/0043751 A1 | 11/2001 | Takahashi et al. | |
| 2002/0024675 A1 | 2/2002 | Foxlin | |
| 2002/0109701 A1 | 8/2002 | Deering | |
| 2003/0001857 A1 | 1/2003 | Doyle | |
| 2003/0032484 A1 | 2/2003 | Ohshima et al. | |
| 2003/0122820 A1 | 7/2003 | Doyle | |
| 2003/0160798 A1 | 8/2003 | Buehler | |
| 2003/0184468 A1 | 10/2003 | Chen et al. | |
| 2004/0021664 A1 | 2/2004 | Takemoto et al. | |
| 2004/0041822 A1 | 3/2004 | Iizuka et al. | |
| 2004/0102247 A1 | 5/2004 | Smoot et al. | |
| 2004/0130552 A1 | 7/2004 | Duluk, Jr. et al. | |
| 2004/0205281 A1 | 10/2004 | Lin et al. | |
| 2005/0009583 A1 | 1/2005 | Cheung et al. | |
| 2005/0062738 A1 | 3/2005 | Handley et al. | |
| 2005/0093873 A1 | 5/2005 | Paltashev et al. | |
| 2005/0140682 A1 | 6/2005 | Sumanaweera et al. | |
| 2006/0170703 A1 | 8/2006 | Liao | |
| 2006/0284792 A1 | 12/2006 | Foxlin | |
| 2007/0018973 A1 | 1/2007 | Shih et al. | |
| 2007/0188444 A1 | 8/2007 | Vale et al. | |
| 2007/0239409 A1 | 10/2007 | Alan | |
| 2007/0257906 A1 | 11/2007 | Shimura et al. | |
| 2008/0049964 A1 | 2/2008 | Porwal et al. | |
| 2008/0143895 A1 | 6/2008 | Peterka et al. | |
| 2008/0252596 A1 | 10/2008 | Bell et al. | |
| 2008/0273755 A1 | 11/2008 | Hildreth | |
| 2008/0293464 A1 | 11/2008 | Cheng et al. | |
| 2008/0293488 A1 | 11/2008 | Cheng et al. | |
| 2008/0312010 A1 | 12/2008 | Marty et al. | |
| 2009/0077504 A1 | 3/2009 | Bell et al. | |
| 2009/0099824 A1 | 4/2009 | Falash et al. | |
| 2010/0073363 A1 | 3/2010 | Densham et al. | |
| 2010/0074489 A1 | 3/2010 | Bacus et al. | |
| 2010/0149372 A1 | 6/2010 | Silverstein | |
| 2010/0177931 A1 | 7/2010 | Whytock et al. | |
| 2010/0194863 A1 | 8/2010 | Lopes et al. | |
| 2010/0296747 A1 | 11/2010 | Srinidhi | |
| 2011/0159885 A1 | 6/2011 | Song et al. | |
| 2011/0165841 A1 | 7/2011 | Baek et al. | |
| 2011/0181622 A1 | 7/2011 | Bacus et al. | |
| 2011/0205389 A1 | 8/2011 | Zhang et al. | |
| 2011/0249076 A1 | 10/2011 | Zhou et al. | |
| 2012/0014456 A1 | 1/2012 | Martinez Bauza et al. | |
| 2012/0139906 A1 | 6/2012 | Zhang et al. | |
| 2012/0162379 A1 | 6/2012 | Dahi et al. | |
| 2012/0183215 A1 | 7/2012 | Van Hook et al. | |
| 2012/0257065 A1 | 10/2012 | Velarde et al. | |
| 2012/0262592 A1 | 10/2012 | Rabii | |
| 2012/0320232 A1 | 12/2012 | Trumbo | |
| 2013/0009943 A1 | 1/2013 | Li et al. | |
| 2013/0021352 A1 | 1/2013 | Wyatt et al. | |
| 2013/0027521 A1 | 1/2013 | DeLuca | |
| 2013/0027606 A1 | 1/2013 | Voss et al. | |
| 2013/0202191 A1 | 8/2013 | Wang | |
| 2013/0231088 A1 * | 9/2013 | Jabara | G06Q 10/101 455/411 |
| 2014/0003408 A1 * | 1/2014 | Chhabra | H04W 48/16 370/338 |
| 2014/0035939 A1 | 2/2014 | Schneider | |
| 2014/0105513 A1 | 4/2014 | Schneider et al. | |
| 2014/0342733 A1 * | 11/2014 | Nagaraj | H04B 1/3805 455/434 |
| 2015/0213640 A1 | 7/2015 | Neill et al. | |

FOREIGN PATENT DOCUMENTS

| | | |
|---|---|---|
| CN | 102006473 | 4/2011 |
| CN | 102055982 | 5/2011 |

OTHER PUBLICATIONS gDebugger, graphicRemedy, http://www.gremedy.com, Aug. 8, 2006.

Duca, et al., A Relational Debugging Engine for Graphics Pipeline, International Conference on Computer Graphics and Ineractive Techniques, ACM SIGGRAPH 2005, pp. 453-463, ISSN: 0730-0301.

* cited by examiner

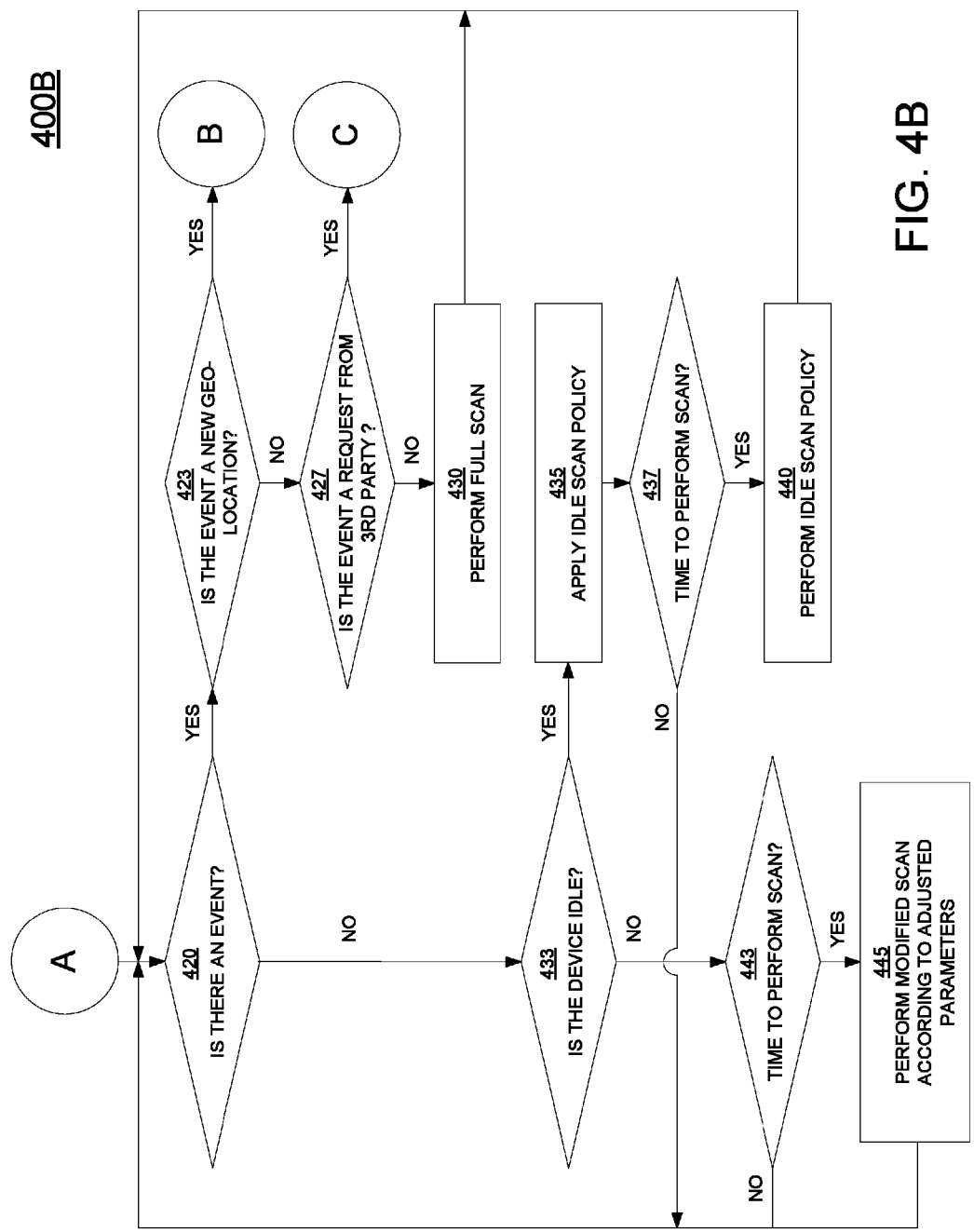

US 9,906,981 B2

METHOD AND SYSTEM FOR DYNAMIC REGULATION AND CONTROL OF WI-FI SCANS

BACKGROUND

Devices may connect over a wireless network to communicate with both local and remote devices. For example, a wireless network includes a Wi-Fi or wireless local area network. In that manner, network resources (e.g., internet) are made available by connecting to the wireless network, such as through a wireless network access point.

Wi-Fi scans are used to determine the availability of wireless access points to a device. When a scan is triggered, a Wi-Fi chip in the device switches across the regulated channels of the Wi-Fi spectrum. If the device is already associated with or connected to an access point on a particular channel (e.g., the home channel), the Wi-Fi radio is tuned out of that channel momentarily to perform a complete and full scan. The Wi-Fi chip can periodically return to the home channel to transmit/receive any buffered frames in between scans.

However, Wi-Fi scans on consumer mobile devices are expensive in terms of Wi-Fi chip power consumption and time for which the radio is off-channel and unavailable for transferring data. As a result, the user experience is less than satisfactory due to jitter introduced when performing scans, and the drainage of battery power. In particular, when tuning the Wi-Fi radio to a different channel from the home channel downstream frames intended for the device are buffered at the access point, and upstream frames to be sent out from the device are also buffered in the device Wi-Fi firmware. The buffering of frames causes a sudden burst of packets when the device switches back to the home channel, which leads to potential packet loss to and from the device. Further, buffering also introduces undesirable delays in packet transmission which introduces jitter in latency-sensitive real-time traffic like audio/video data received by the device. That is, performing scans while amidst a streaming session at the device can disrupt packet flow and introduce jitter, such that audio/visual synchronization issues arise, and video stuttering may occur. Further, when performing scans, the continuous switching of channels and sending of probes results in increased power consumption by the Wi-Fi chip. Periodic scanning could potentially lead to battery drain in the device.

It is desirable to ensure a high quality user experience when performing scans at a device.

SUMMARY

In embodiments of the present invention, a computer implemented method for discovering wireless access is disclosed. In other embodiments, a non-transitory computer readable medium is disclosed having computer-executable instructions for causing a computer system to perform a method for discovering wireless access. In still other embodiments, a computer system is disclosed comprising a processor and memory coupled to the processor and having stored therein instructions that, if executed by the computer system, cause the computer system to execute a method for discovering wireless access. The method includes launching an application in association with a first device. A Wi-Fi scan policy is accessed, wherein the scan policy is associated with the application. The method includes setting parameters for implementing a plurality of Wi-Fi scans from the first device based on said Wi-Fi scan policy.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIGS. 4A-D are flow diagrams illustrating methods for implementing a scanning policy for a particular application within a device, in accordance with one embodiment of the present disclosure.

DETAILED DESCRIPTION OF THE INVENTION

Figure 1:
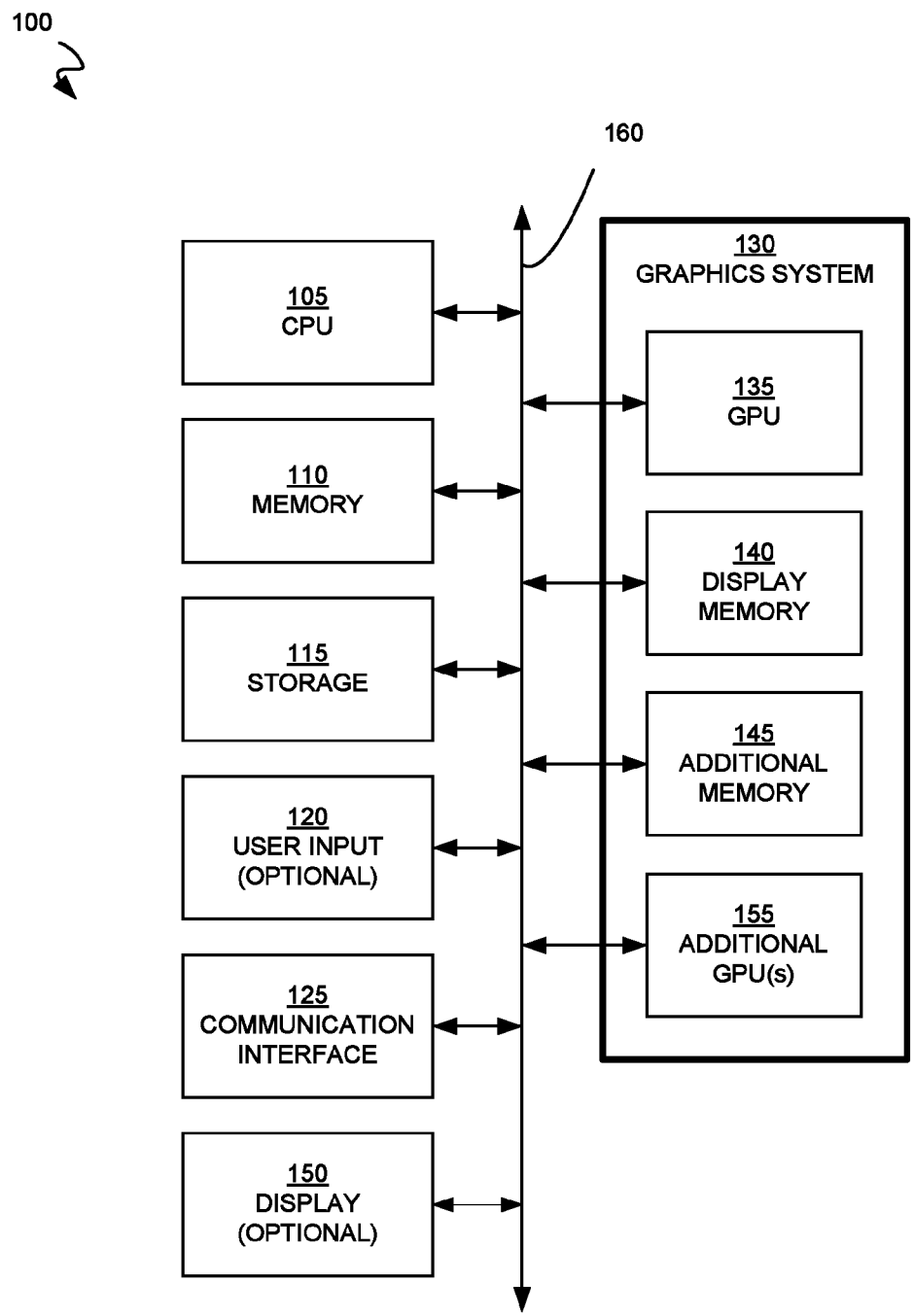
FIG. 1 depicts a block diagram of an exemplary computer system suitable for implementing embodiments according to the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Accordingly, embodiments of the present invention provide for dynamic regulation and control over performing Wi-Fi scans. By optimizing scans according to device state, the application that is making a scan request, and/or the currently active application, interruptions to any established wireless connections are drastically reduced. In that manner, high quality of user experience is maintained especially over low latency/packet loss sensitive connections.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "launching," "executing," "accessing," "setting," "establishing," or the like, refer to actions and processes (e.g., in flowcharts 4A-D of the present Application) of a computer system or similar electronic computing device or processor (e.g., computer system 100 and client device 200). The computer system or similar electronic computing device manipulates and transforms data represented as physical (electronic) quantities within the computer system memories, registers or other such information storage, transmission or display devices.

FIGS. 4A-D are flowcharts of examples of computer-implemented methods for the dynamic regulation and control of Wi-Fi scans in a device, according to embodiments of the present invention. Although specific steps are disclosed in the flowcharts, such steps are exemplary. That is, embodiments of the present invention are well-suited to performing various other steps or variations of the steps recited in the flowcharts.

Other embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram of an example of a computing system 100 capable of implementing embodiments of the present disclosure. Computing system 100 broadly represents any single or multi-processor computing device or system capable of executing computer-readable instructions. Examples of computing system 100 include, without limitation, workstations, laptops, client-side terminals, servers, distributed computing systems, handheld devices, gaming systems, gaming controllers, or any other computing system or device. In its most basic configuration, computing system 100 may include at least one processor 105 and a system memory 110.

It is appreciated that computer system 100 described herein illustrates an exemplary configuration of an operational platform upon which embodiments may be implemented to advantage. Nevertheless, other computer system with differing configurations can also be used in place of computer system 100 within the scope of the present invention. That is, computer system 100 can include elements other than those described in conjunction with FIG. 1. Moreover, embodiments may be practiced on any system which can be configured to enable it, not just computer systems like computer system 100. It is understood that embodiments can be practiced on many different types of computer systems 100. System 100 can be implemented as, for example, a desktop computer system or server computer system having a power general-purpose CPUs coupled to a dedicated graphics rendering GPU. In such an embodiment, components can be included that add peripheral buses, specialized audio/video components, I/O devices, and the like. Similarly, system 100 can be implemented as a hand-held device (e.g., cell phone, etc.) or a set-top video game console device, such as, for example Xbox®, available from Microsoft corporation of Redmond, Wash., or the PlayStation3®, available from Sony Computer Entertainment Corporation of Tokyo, Japan, or the any of the SHIELD Portable devices (e.g., handheld gaming console, tablet computer, television set-top box, etc.) available from Nvidia Corp. System 100 can also be implemented as a "system on a chip", where the electronics (e.g., the components 105, 110, 115, 120, 125, 130, 150, and the like) of a computing device are wholly contained within a single integrated circuit die. Examples include a hand-held instrument with a display, a car navigation system, a portable entertainment system, and the like.

In the example of FIG. 1, the computer system 100 includes a central processing unit (CPU) 105 for running software applications and optionally an operating system. Memory 110 stores applications and data for use by the CPU 105. Storage 115 provides non-volatile storage for applications and data and may include fixed disk drives, removable disk drives, flash memory devices, and CD-ROM, DVD-ROM or other optical storage devices. The optional user input 120 includes devices that communicate user inputs from one or more users to the computer system 100 and may include keyboards, mice, joysticks, touch screens, and/or microphones.

The communication or network interface 125 allows the computer system 100 to communicate with other computer systems via an electronic communications network, including wired and/or wireless communication and including the internet. The optional display device 150 may be any device capable of displaying visual information in response to a signal from the computer system 100. The components of the computer system 100, including the CPU 105, memory 110, data storage 115, user input devices 120, communication interface 125, and the display device 150, may be coupled via one or more data buses 160.

In the embodiment of FIG. 1, a graphics system 130 may be coupled with the data bus 160 and the components of the computer system 100. The graphics system 130 may include a physical graphics processing unit (GPU) 135 and graphics memory. The GPU 135 generates pixel data for output images from rendering commands. The physical GPU 135 can be configured as multiple virtual GPUs that may be used in parallel (concurrently) by a number of applications executing in parallel.

Graphics memory may include a display memory 140 (e.g., a frame buffer) used for storing pixel data for each pixel of an output image. In another embodiment, the display memory 140 and/or additional memory 145 may be part of the memory 110 and may be shared with the CPU 105. Alternatively, the display memory 140 and/or additional memory 145 can be one or more separate memories provided for the exclusive use of the graphics system 130.

In another embodiment, graphics processing system 130 includes one or more additional physical GPUs 155, similar to the GPU 135. Each additional GPU 155 may be adapted to operate in parallel with the GPU 135. Each additional GPU 155 generates pixel data for output images from rendering commands. Each additional physical GPU 155 can be configured as multiple virtual GPUs that may be used in parallel (concurrently) by a number of applications executing in parallel. Each additional GPU 155 can operate in conjunction with the GPU 135 to simultaneously generate pixel data for different portions of an output image, or to simultaneously generate pixel data for different output images.

Each additional GPU 155 can be located on the same circuit board as the GPU 135, sharing a connection with the GPU 135 to the data bus 160, or each additional GPU 155 can be located on another circuit board separately coupled with the data bus 160. Each additional GPU 155 can also be integrated into the same module or chip package as the GPU 135. Each additional GPU 155 can have additional memory, similar to the display memory 140 and additional memory 145, or can share the memories 140 and 145 with the GPU 135.

Additional logic block for power management.

Figure 2:
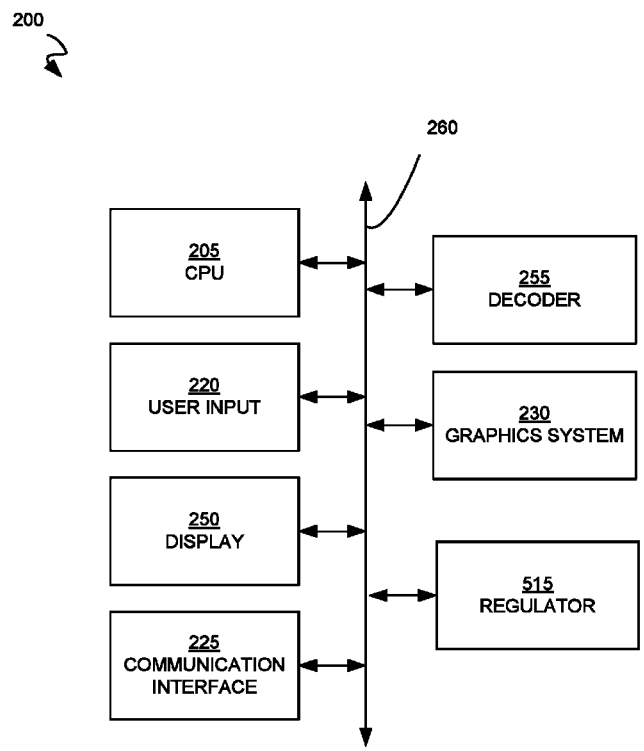
FIG. 2 is a block diagram of an example of a client device capable of implementing embodiments according to the present disclosure.

FIG. 2 is a block diagram of an example of an end user or client device 200 capable of implementing embodiments according to the present invention. In the example of FIG. 2, the client device 200 includes a CPU 205 for running software applications and optionally an operating system. The user input 220 includes devices that communicate user inputs from one or more users and may include keyboards, mice, joysticks, touch screens, microphones, and/or gaming controllers.

The communication interface 225 allows the client device 200 to communicate with other computer systems (e.g., the computer system 100 of FIG. 1) via an electronic communications network, including wired and/or wireless communication and including the internet. The decoder 255 may be any device capable of decoding (decompressing) data that may be encoded (compressed). For example, the decoder 255 may be an H.264 decoder. The display device 250 may be any device capable of displaying visual information, including information received from the decoder 255. The display device 250 may be used to display visual information generated at least in part by the client device 200. However, the display device 250 may be used to display visual information received from the computer system 100. The components of the client device 200 may be coupled via one or more data buses 260. Further, the components may or may not be physically included inside the housing of the client device 200. For example, the display 250 may be a monitor that the client device 200 communicates with either through cable or wirelessly.

Relative to the computer system 100, the client device 200 in the example of FIG. 2 may have fewer components and less functionality and, as such, may be referred to as a thin client. However, the client device 200 may include other components including all those described above with regard to the computer system 100, for example, graphics system 230 that may be similar to graphics system 130 of FIG. 1. In general, the client device 200 may be any type of device that has display capability, the capability to decode (decompress) data, and the capability to receive inputs from a user and send such inputs to the computer system 100. However, the client device 200 may have additional capabilities beyond those just mentioned. The client device 200 may be, for example, a personal computer, a tablet computer, a television, a hand-held gaming system, or the like.

In addition, the computer system 100 includes a regulator 515 that is configured for dynamic regulation and control over the performing of scans on wireless networks (e.g., performing Wi-Fi scans) at a device. Scans are dynamically adjusted depending on the state of the device, the application that is requesting the scan, and/or the application that is currently active. In this manner, the time and manner for performing scans are adapted to the state of the device, and reduce or eliminate interruption to the flow of traffic to the device. The functions of the regulator are described in more detail in relation to FIGS. 4A-D, and 5.

Throughout this Application, the term "gaming application" is used for illustration only, and embodiments of the present invention can be applied to any type of application. In one embodiment, an application is a video game application; however, the invention is not so limited. That is, the application can be any type of application. For example, the application may provide financial services, computer aided design (CAD) services, etc. In still another example, the application may be a programming guide that provides, in table form, a list of the various programs that are available on different television channels in different time slots, and the client device may be a set top box (cable or satellite).

Figure 3:
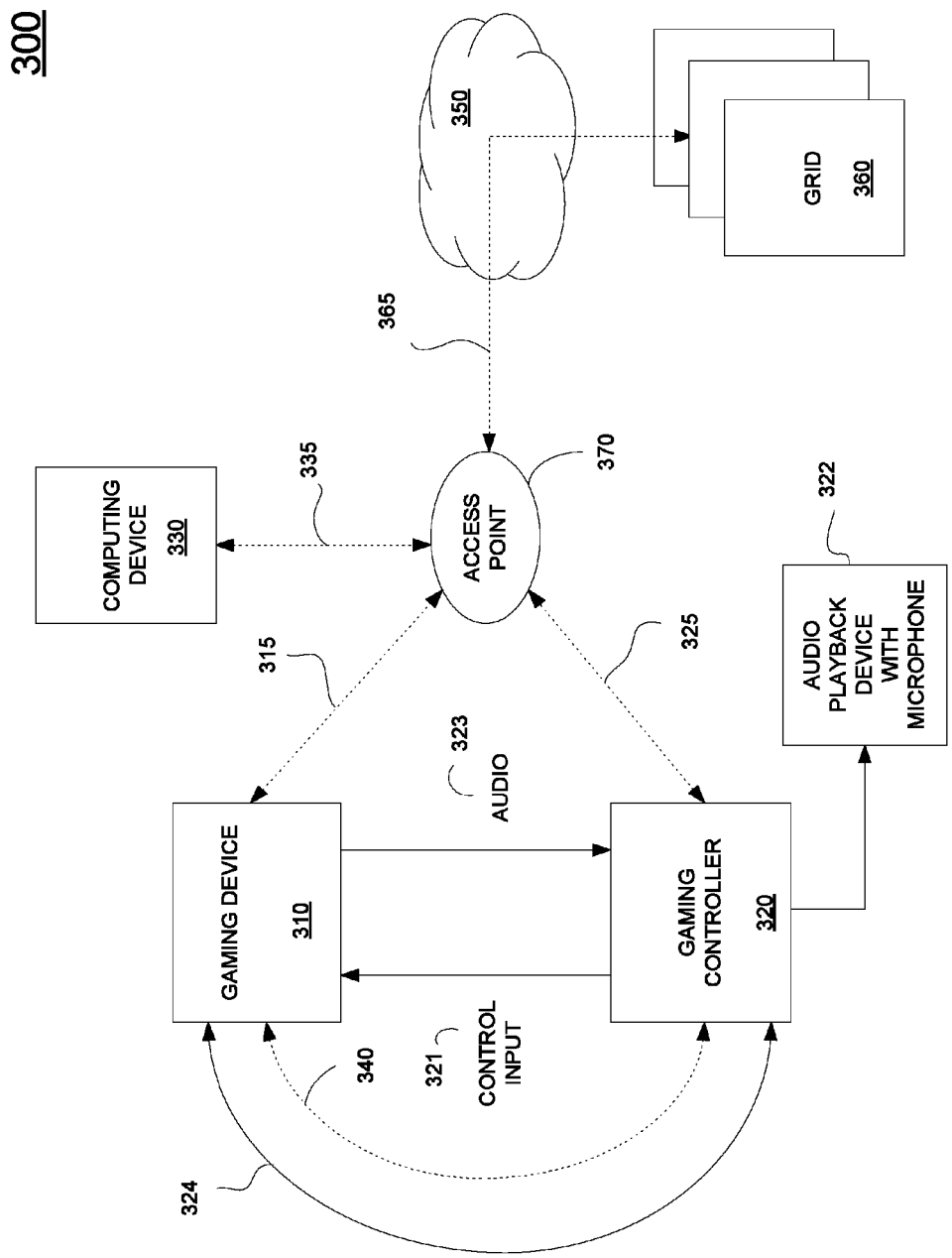
FIG. 3 is a block diagram of an example of an end terminal or gaming device that is coupled to one or more devices through a network architecture that may include one or more communication networks, in accordance with one embodiment of the present disclosure.

FIG. 3 is a block diagram of an example of an end terminal or gaming device 310 that is coupled to one or more devices through a network architecture 300 that may include one or more communication networks, in accordance with one embodiment of the present disclosure. For example, gaming device 310 may be the client device 200 of FIG. 2, and may be configured as, for example, a personal computer, a tablet computer, a television, a hand-held gaming system, or the like. The gaming device 310 may also include a display (e.g., a high-definition display) for the display of various images, including video from a locally executing gaming application, video from a remotely executing gaming application, secondary or supplemental video of related to a gaming application, etc.

As shown in FIG. 3, gaming device 310 is coupled to a gaming controller 320. A user interfaces with gaming controller 320 to provide control input 321 upstream to gaming device 310, wherein the control input 321 is used to provide instructions to an application that is executing locally on device 310 or at a back end server. Gaming controller 320 may be configured with an audio system (not shown), such as speakers, such that audio data 323 delivered downstream to the gaming controller 320 from the gaming device 310 may be played for the user. Other information or data may be communicated between gaming device 310 and gaming controller 320.

Control input 321 and audio 323 may be communicated over a peer-to-peer connection 340 between gaming device 310 and gaming controller 320, in one embodiment. In that manner, a direct connection is established between the gaming device 310 and 320 without using any intervening network devices. In another embodiment, a wired connection (not shown) is established between gaming device and gaming controller 320 to provide direct communication.

In still another embodiment, audio is delivered between the gaming controller 320 and the gaming device 310 over a bi-directional stream 324. For example, an audio stream generated by the built-in microphone in the gaming controller 320, or generated by a microphone associated with the audio playback device that is electrically coupled (e.g., wired or wireless) to the gaming controller 320, may be delivered to the gaming device 310. For purposes of illustration only, the audio stream may be configured to implement a "voice searching" capability that is handled by the gaming device 310, or may be configured to enable voice chatting between various participants of a gaming application through the gaming device 310, or the like. Also, audio signals from the gaming device 310 to the gaming controller 320 may be delivered over the bi-directional stream 324 in the reverse direction. In one embodiment, stream 324 is kept-alive such that the connection is not terminated even if, for example, a period of inactivity occurs, or when communication is interrupted. In that manner, wireless frames associated with stream 324 are not lost even when gaming device 310 may be scanning for wireless access points. As such, a higher quality experience is provided for the user because the audio stream between the gaming device 310 and the gaming controller 320 is not lost during scanning, for example.

In another embodiment, control input 321 and audio 323 may be communicated between gaming device 310 and gaming controller 320 over a wireless network. For example, a Wi-Fi network may be established to facilitate local communication between gaming device 310 and gaming controller 320 using access point 370. As shown, gaming device 310 communicates with access point 370 over wireless path 315, and gaming controller 320 communicates with access point 370 over wireless path 325. In addition, access point 370 may be used to connect to other remotely located devices through communication network 350 (e.g., internet). Network 350 generally represents any telecommunication or computer network including, for example, an intranet, a wide area network (WAN), a local area network (LAN), a personal area network (PAN), or the internet.

As previously discussed, gaming device 310 may be conduit for the local or remote execution of a gaming application. For instance, in one embodiment, the gaming application is executed locally on the gaming device 310. The gaming device 310 may act as a stand-alone unit and is configured for executing and controlling the actions within an internally stored gaming application (e.g., receiving user input, providing audio, and displaying video). Gaming controller 320 may provide a further configuration for local execution of the gaming application.

In another embodiment, the gaming application is executed at a back-end computing resource, wherein the back-end computing resource may provide additional computing power. The gaming device 310 is Wi-Fi enabled, such that information from the gaming application that is executing remotely is streamed to the gaming device 310 that may be located anywhere there is a Wi-Fi connection. For example, the gaming device 310 is communicatively coupled (e.g., directly or indirectly through a WAN, LAN, Wi-Fi, etc.) to various secondary, local devices, such as, those within a short distance of each other, like in a home environment. In this case, the gaming application may be executing at a computing device 330 that is connected to the gaming device 310 over a local area network serviced by one or more access points 370, in one embodiment. For example, the computing device 330 may be co-located with the gaming device 310 in one residence or building. Gaming device 310 may act as a display for personal computer 330 or mobile device that are executing a gaming application, or an TV monitor (e.g., high-definition television) for displaying video from a gaming application executed on the gaming device 310.

In another embodiment, the gaming device 310 is communicatively coupled (e.g., through WAN, LAN, internet, etc.) to remote devices, such as, remote web servers, GRID servers 360, etc. In that case, the gaming application may be executing at a back-end gaming network facilitator, such as GRID 360, providing various services that are designed to give end-users the best experience when executing associated applications (e.g., gaming applications). Gaming device 310 may be coupled with GRID 360 through communication network 350, via the access point 370 of the Wi-Fi network. In this case, the gaming device 310 is configured as an end terminal used for displaying video in combination with a GRID system 360 that provides computing and graphics processing at a back-end server. In particular, the GRID system 360 provides cloud based virtualized computing and graphics processing for remote displays. For example, the GRID system 360 may include a number of virtual computing processing units (CPUs) and graphics processing units (GPUs) that in combination support one or more gaming applications.

In one embodiment, GRID system 360 provides network resources managed by one or more host operating systems, wherein the network resources (e.g., CPU, GPU, etc.) are virtualized and shared within one or more virtual machines (VMs) and external communication networks. That is, one or more host systems manage a plurality of physical servers that support a plurality of virtual machines. In particular, the host manager in conjunction with other elements (e.g., hypervisor) creates, manages, and runs a plurality of virtual machines. In one implementation, the GRID system 360 may include a distributed network of computing resources made available through a communication network. In that manner, the GRID system 360 provides complete, virtualized gaming systems that are also designed to provide high power graphics processing that are accessed through end terminals and/or gaming devices (e.g., device 310). As such, a user may load a gaming application using a virtualized CPU and/or GPU supported at the GRID system 360, wherein the virtual CPU and/or GPU combination is associated with a particular hardware and/or software configuration.

As shown, gaming device 310 and/or gaming controller 320 may be heavily reliant on Wi-Fi communications, and greatly benefits from the dynamic regulation and control Wi-Fi scans of embodiments of the present invention, especially during the execution of an application. For example, the gaming device 310 can perform scans under adjusted scan parameters during a streaming session (e.g., with an executing gaming application) without disrupting the packet flow or introducing jitter in audio and video. In addition, more efficient power consumption is realized by reducing the frequency and number of scans performed while the device is idle.

FIGS. 4A-D are flow diagrams illustrating methods for dynamic regulation and control of scans over wireless network, in accordance with embodiments of the present disclosure. The methods outlined in flow diagrams 400A-D are implementable by one or more components of the computer system 100, client device 200, and/or gaming device 310 of FIGS. 1-3, respectively. Furthermore, the methods outlined in flow diagrams 400A-D are performed in combination to implement the dynamic regulation and control of scans (e.g., Wi-Fi scans).

Figure 4A:
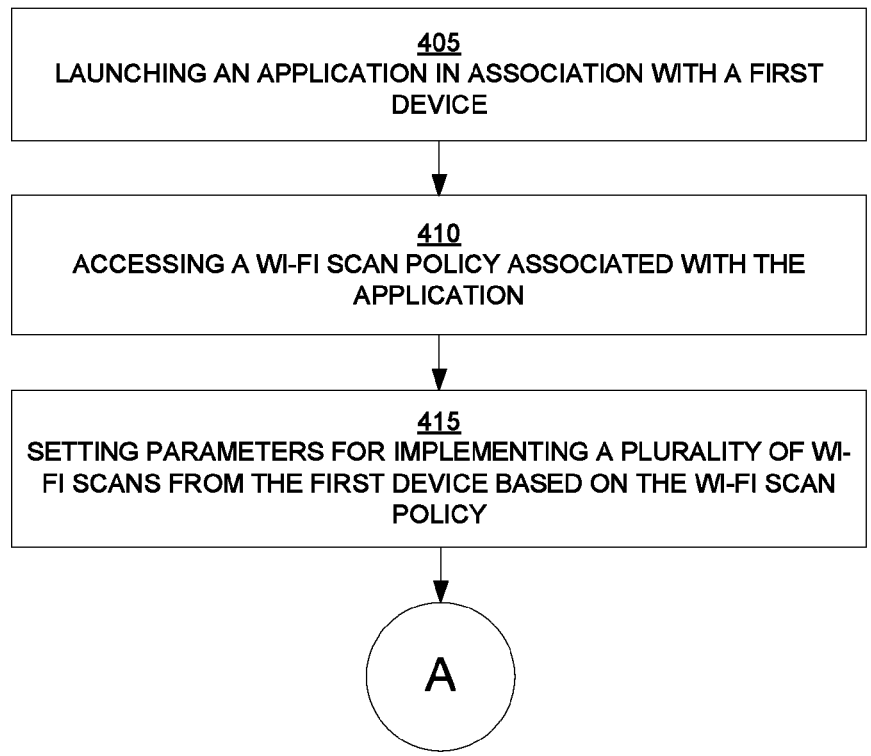

In particular, FIG. 4A is a flow diagram 400A illustrating a method for dynamically regulating and controlling scans of a wireless network (e.g., Wi-Fi) at a device, in accordance with one embodiment of the present disclosure. Regulation and control is performed by implementing a scanning policy for a particular application within a device executing the application. In still another embodiment, flow diagram 400A illustrates a computer implemented method for dynamically regulating and controlling scans of a wireless network (e.g., Wi-Fi) at a device. In another embodiment, flow diagram 400A is implemented within a computer system including a processor and memory coupled to the processor and having stored therein instructions that, if executed by the computer system causes the system to execute a method for dynamically regulating and controlling scans of a wireless network (e.g., Wi-Fi) at a device. In still another embodiment, instructions for performing a method as outlined in flow diagram 400A are stored on a non-transitory computer-readable storage medium having computer-executable instructions for dynamically regulating and controlling scans of a wireless network (e.g., Wi-Fi) at a device.

At 405, the method includes launching an application in association with a first device. For purposes of illustration, the application is executed locally by a processor of the first device, and implementation of a scan policy is optimized to reduce and/or eliminate jitter (e.g., audio and video) during execution and presentation of the application at the device. In other embodiments, the application may be remotely executed by another processor, wherein optimization of a scan policy may be similarly performed. In either case, interruption of the execution of and interaction with the application and/or streaming of the application is minimized when performing scans.

At 410, the method includes accessing a Wi-Fi scan policy that is associated with the application. In particular, the application may be hardcoded with a profile (e.g., the scan rate and the scan parameters to be applied). For example, the scan policy may specify latency requirements for the application. That is, the scan policy may indicate what latency is tolerated. For instance, a high performance gaming application with sophisticated graphics may have low latency tolerance in order to provide the best user experience. Other low performance gaming application may tolerate a higher latency as the application may not have sophisticated graphics.

At 415, the method includes setting parameters for implementing a plurality of Wi-Fi scans from the first device based on said Wi-Fi scan policy. That is, depending on the scan policy for the application, the parameters used for implementing Wi-Fi scans are set and stored in a configuration file at the device. As an illustration, a latency requirement (e.g., high or low) of an application as reflected in the Wi-Fi scan policy may indicate that default scan parameters may need to be adjusted so that scans are performed in a manner to meet the latency requirements, as will be further described below. In one embodiment, the parameters are set upon instantiation of the application on the first device.

For example, embodiments of the present invention provide fine-grained control over Wi-Fi scans by dynamically adjusting the scan rate and/or adjusting scan parameters according to the scan policy set by the application. In one case, by adjusting the scan rate (the number of full scans performed in a period) using application specific scan rates, exponential back-off scan triggers, and event based scan triggers, efficient use of battery power is realized. For instance, the number of scans may be exponentially reduced if the device is idle, such that the scan rate is exponentially reduced after every continuous 15 second period that no movement is detected on the device. This may also minimize jitter/packet loss depending on the current traffic pattern. In another case, by dynamically adjusting scan parameters, jitter/packet loss may be minimized. Scan parameters may include, but are not limited to: the wait time between scans (e.g., scan rate); active scan time; passive scan time; the number and/or list of channels to scan; dwell time on each channel for active and passive scanning, which determines how long the Wi-Fi radio stays out of the home channel; home dwell time; a history of network SSIDs (service set identifiers)(e.g., BSSID MAC address) to scan for, wherein the device has previously successfully connected to each SSID in the history; number of probes per actively scanned channel; scan rate; the number of probes sent out in a scan request; etc.

The scan parameters define how scans are performed, and in particular how passive and active scans are preformed. Implementation of a scan policy when performing passive scans is described more fully in relation to FIG. 6. Implementation of a scan policy when performing active scans is described more fully in relation to FIG. 7.

FIG. 4B is a flow diagram 400B illustrating a method for implementing a scan policy for an application that is adjusted according to the state of a device, wherein the scan may be triggered by an event, in accordance with one embodiment of the present disclosure. In still another embodiment, flow diagram 400B illustrates a computer implemented method for implementing a scan policy for an application that is adjusted according to the state of a device. In another embodiment, flow diagram 400B is implemented within a computer system including a processor and memory coupled to the processor and having stored therein instructions that, if executed by the computer system causes the system to execute a method for implementing a scan policy for an application that is adjusted according to the state of a device. In still another embodiment, instructions for performing a method as outlined in flow diagram 400B are stored on a non-transitory computer-readable storage medium having computer-executable instructions for implementing a scan policy for an application that is adjusted according to the state of a device.

Flow diagram 400B illustrates the implementation of the scan policy set in flow diagram 400A of FIG. 4A. That is, after the parameters are set for implementing Wi-Fi scans in the first device according to a scan policy, scans are performed according to the set parameters when the device is active, are performed according to an idle scan policy when the device is idle, and are performed as triggered by an event. In particular, beginning from point A illustrated in both FIGS. 4A-B, at decision step 420, the method determines whether there was an event. If no event has occurred, then the method determines whether the device is idle at decision step 433. If the device is operating normally and not in an idle state, the method then determines whether a scan needs to be performed. For example, the scan is performed in association with the application that its executing locally on the first device, and in accordance with the scan parameters adjusted from their default state in compliance with the application scan policy (e.g., latency requirements). If it is not time to perform a scan, the process returns back to point A to being the process in flow diagram 400B again. on the other hand, if a scan is to be performed, then at 445, the method performs a scan that is modified from a full scan procedure (e.g., as implemented in the default mode) and preformed in accordance with the adjusted parameters set in 415. Thereafter, the process returns back to point A to begin the process in flow diagram 400B again.

Returning back to 420, if an event triggers a scan, then the process proceeds to decision step to determine if the event is associated with a new geo-location. If the event is associated with a new geo-location, then the process proceeds to point C and FIG. 4C. On the other hand, if the event is not associated with a new geo-location, then the process proceeds to decision step 427 to determine if the event is a request from a third party application. If the event is triggered by a scan request from a third party application, then the process proceeds to point D and FIG. 4D. On the other hand, if the event is not triggered by a scan request from a third party application, then the event is one of a number of remaining events, and the process proceeds to 430 to perform a full scan. For example, an event that triggers a full scan includes a motion based scan trigger. That is, when the device is in an idle state and an event indicates that there may be some user interaction with the device (e.g., accelerometer detects movement, such as the user checking notifications), then a full scan is immediately performed. That is, some interaction with the device is detected at the device after the device has been in an idle state, or period of inaction, for a threshold period. In another case, while the display is shut down for a certain period, a trigger event occurs when the device screen is turned on, and a full scan is immediately performed. After the full scan is performed, the a return back to point A is performed to begin the process in flow diagram 400B again.

Returning back to 433, if it is determined that the device is in an idle state, then the process proceeds to 435 to modify the scan parameters and apply an idle scan policy. For example, to save power, the number of scans over a period and/or the scan rate is reduced when the device is idle. For example, a default scan rate may perform a full scan every 10 seconds, wherein a modified scan based on a scan policy while the device is active may perform a scan every 1 to 2 minutes. However, if the device is idle, then the scan rate may be further reduced. In one implementation, the scan rate is exponentially reduced the more time has elapsed, such that the period for scanning increases over time. At some point, the scan rate may go to zero, wherein no scans are performed while the device is idle. At decision step 437, if it is not time to perform a scan under the idle scan policy, then a return back to point A is performed to begin the process in flow diagram 400B again. On the other hand, if it is time to perform a scan under the idle scan policy, then at 440, a scan is performed in accordance with the idle scan policy. After the scan is performed, the process returns back to point A to begin the process in flow diagram 400B again.

Figure 4C:
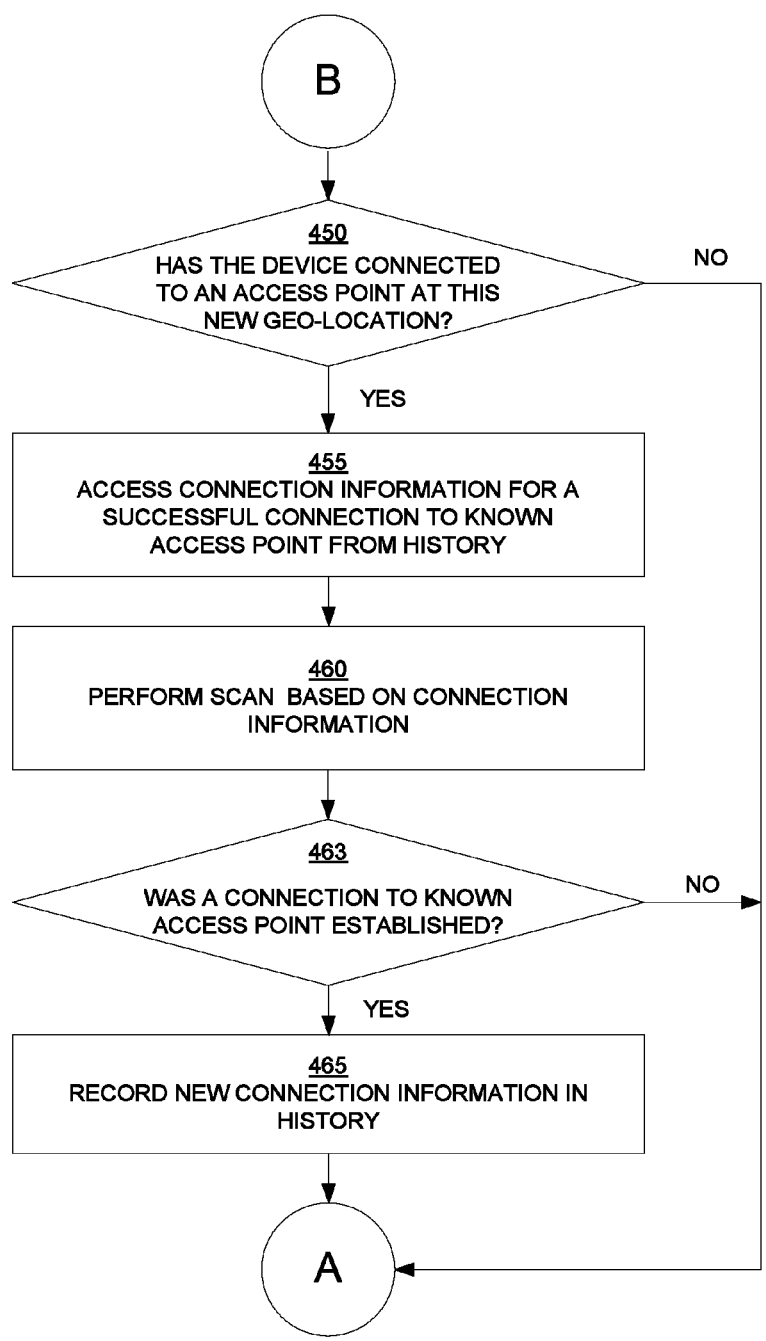

FIG. 4C is a flow diagram 400C illustrating a method for performing a scan that is triggered by a new geo-location event, in accordance with one embodiment of the present disclosure. In still another embodiment, flow diagram 400C illustrates a computer implemented method for performing a scan that is triggered by a new geo-location event. In another embodiment, flow diagram 400C is implemented within a computer system including a processor and memory coupled to the processor and having stored therein instructions that, if executed by the computer system causes the system to execute a method for performing a scan that is triggered by a new geo-location event. In still another embodiment, instructions for performing a method as outlined in flow diagram 400C are stored on a non-transitory computer-readable storage medium having computer-executable instructions for implementing a scan policy for an application that is adjusted according to the state of a device. Flow diagram 400C illustrates the implementation of the scan policy set in flow diagram 400A of FIG. 4A. That is, after the parameters are set for implementing Wi-Fi scans in the first device according to a scan policy, scans are performed as triggered by an event of the detection of a new geo-location.

In particular, beginning from point B illustrated in both FIGS. 4A and 4C, at decision step 450, and in response to a new geo-location event trigger, the method determines a current geo-location of the devices, and whether the device has previously connected to an access point at this geo-location by accessing connection information stored in a history at the device, for example. If no connection was previously made, then a return back to point A is performed to begin the process in flow diagram 400B again. On the other hand, if the history of connections shows that the device has previously connected to a now known access point at this geo-location over a first channel, then the process proceeds to 455, wherein connection information for a successful connection is accessed. This information may include the channel and/or frequency over which connection was made, the SSID of the network, time and date, strength of the connection, etc. At 460, a scan is performed using the connection information for any remembered access points at that geo-location. In one embodiment, a request to connect with the known access point is delivered from the device over the first channel. At decision step 463, the method determines whether a connection is established with the known access point. If no connection was made, then a return back to point A is performed to begin the process in flow diagram 400B again. On the other hand, if a connection was made, then the new connection information is recorded in the history, and a return back to point A is performed to begin the process in flow diagram 400B again.

Figure 4D:
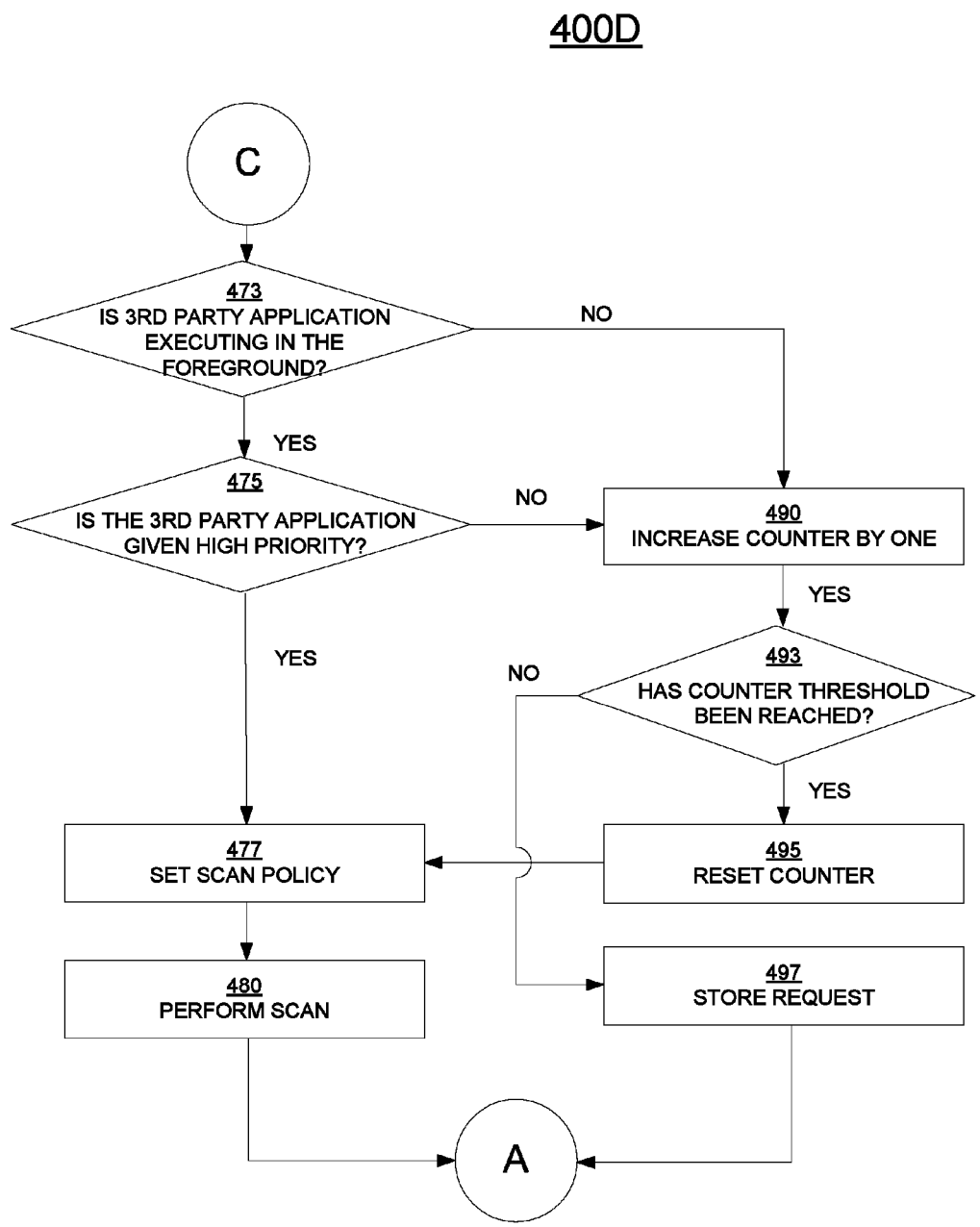

FIG. 4D is a flow diagram 400D illustrating a method for performing a scan that is requested by a third party application, in accordance with one embodiment of the present disclosure. In still another embodiment, flow diagram 400D illustrates a computer implemented method for performing a scan that is requested by a third party application. In another embodiment, flow diagram 400D is implemented within a computer system including a processor and memory coupled to the processor and having stored therein instructions that, if executed by the computer system causes the system to execute a method for performing a scan that is requested by a third party application. In still another embodiment, instructions for performing a method as outlined in flow diagram 400D are stored on a non-transitory computer-readable storage medium having computer-executable instructions for performing a scan that is requested by a third party application. Flow diagram 400D illustrates the implementation of the scan policy set in flow diagram 400A of FIG. 4A. That is, after the parameters are set for implementing Wi-Fi scans in the first device according to a scan policy, scans are performed as triggered by an event of the receipt of a scan request from a third party application that is different than the application used to set the scan parameters. For example, the third party application may be a gaming application, or a mapping application that is sending out location information related to the device to a back end server associated with the application, or is making a request for information delivered from a back-end server.

In particular, beginning from point C illustrated in both FIGS. 4B and 4D, at decision step 473, and in response to an event trigger indicating that a scan request is received at the device by a third party application, the method determines if the third party application is executing in the foreground. If the third party is operating in the background, then a scan is not immediately performed. Instead, the scan request is batched with other scan requests. In one embodiment, the scan requests are batched according to the type of request, such as similar information requested (e.g., location of the device). The collected scan requests are addressed after a threshold amount of requests has been reached. Batching is implemented by a counter, in one implementation, though other implementations are supported. For instance, at 490 a counter is increased by one, then at decision step 493, it is determined whether a counter threshold has been reached. If the threshold has not been reached, then the request is stored for later processing at 497, and a return back to point A is performed to begin the process in flow diagram 400B again. On the other hand, if a counter threshold has been reached at 493, then the process routes to 495 to reset the counter. At 477, parameters are set for implementing a scan policy associated with a third party application, for example, and at 480, the scan is performed according to the newly set parameters. That is, the scan parameters are set according to the requesting third party application or to a generic third party application representative of the requesting third party applications, so that the best suitable settings are chosen depending on the jitter/packet loss tolerance of the representative third party application. In one embodiment, the scan is performed in compliance with the parameters set in 415 of FIG. 4A. A return back to point A is performed to begin the process in flow diagram 400B again.

Returning back to decision step 473, if the application is operating in the foreground, then the process turns to decision step 475 to determine if the third party application is given high priority for performing scans. If the third party application is given a low priority, then the process routes to 490, as previously described, to increase the counter by one. That is, the scan is delayed until receiving a total number of similar scans (e.g., from third party applications) that meets or exceeds a threshold. On the other hand, if the third party application is given a high priority, then the process routes to 477 to set the scan parameters for implementing a scan policy associated with a third party application, for example, and at 480, the scan is performed according to the newly set parameters. That is, the scan parameters are set according to the requesting third party application so that the best suitable settings are chosen depending on the jitter/packet loss tolerance of the third party application. In one embodiment, the scan is performed in compliance with the parameters that have been previously set in 415 of FIG. 4A. A return back to point A is performed to begin the process in flow diagram 400B again.

Figure 5:
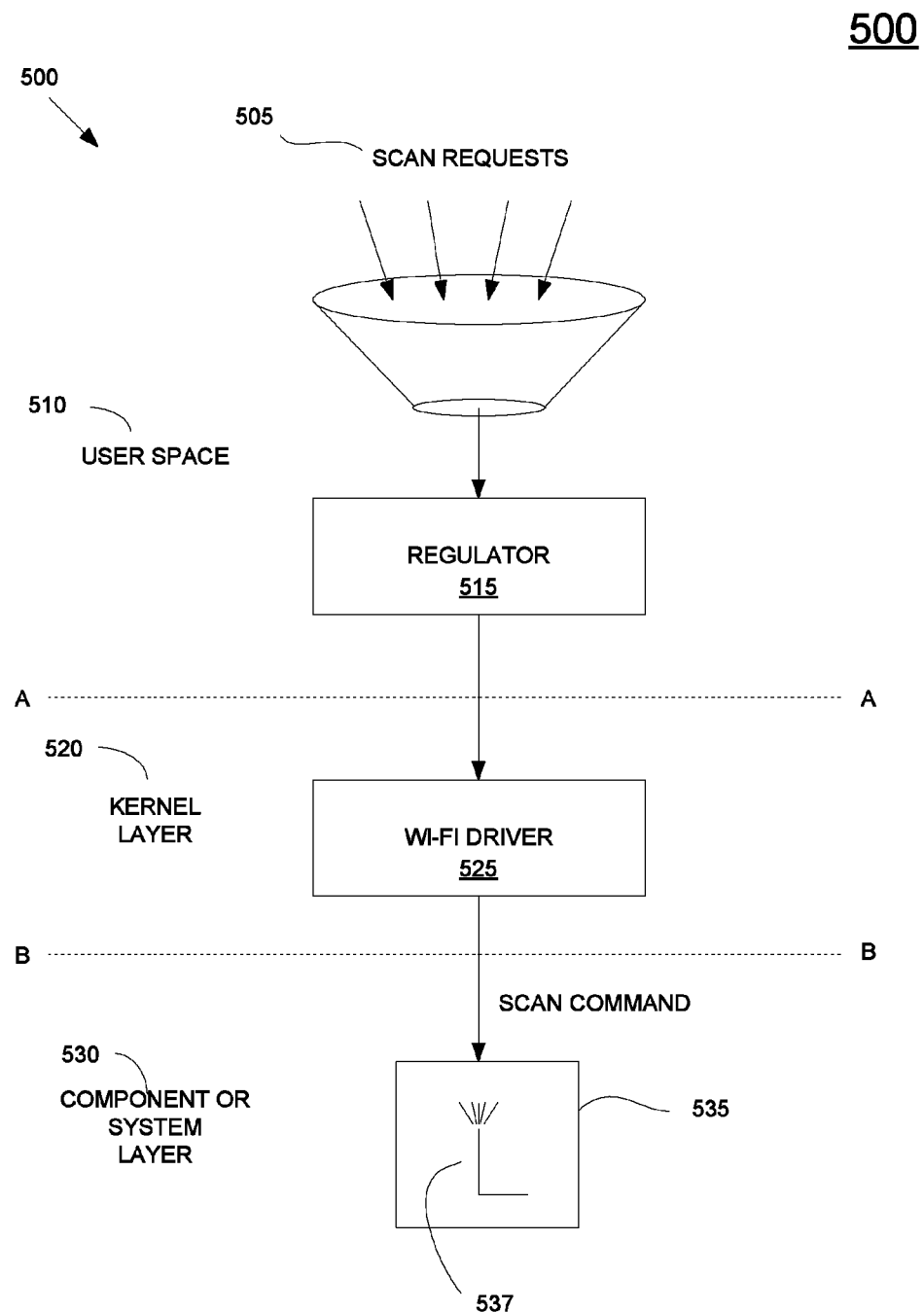
FIG. 5 is a diagram illustrating the interaction of the regulator in user space with a Wi-Fi driver and Wi-Fi radio within a device, wherein the regulator is configured to implement a scan policy, in accordance with one embodiment of the present disclosure.

FIG. 5 is a diagram illustrating the interaction of the regulator 515 in user space 510 with a Wi-Fi driver 525 and Wi-Fi radio 537 of a software stack within a device 500, wherein the regulator 515 is configured to implement a scan policy, in accordance with one embodiment of the present disclosure. For example, the flow charts of FIGS. 4A-D may be implemented within the device 500 to dynamically regulate and control scans of a wireless network (e.g., Wi-Fi).

Execution of a an application is performed on a software stack in device 500. The software stack includes an user layer 510. The user layer includes one or more applications (e.g., software) that allow a user to perform a set of functions, tasks, or activities. For example, an application may be a gaming application, a word processing program, a financial planner, accounting software, media player, etc. The application is executed within the kernel layer 520 that manages I/O (input/output) requests from the application located at the user layer 510. The kernel layer translates the I/O requests into machine language instructions (e.g., data processing) that is understood by the processor and other electronic components of the device 500 at the system or component layer 530. For example, the Wi-Fi chip 535 may be located at the system layer 530, which includes a Wi-Fi radio 537. The Wi-Fi chip is driven by the Wi-Fi driver 525 at the kernel layer 520.

In particular, an application at the user space 510 is associated with a set of scan parameters defined in a scan policy. The device scan parameters of the device 500 may be modified to reflect the scan policy of the application. For example, these parameters are dynamically modified within device 500 depending on the state of the device, the activity of the application, and/or the latency requirements set up in the scan policy associated with the device. The regulator 515 is configured to determine the scan policy of the application, and set the corresponding scan parameters according to the scan policy within the kernel layer 520. The scan parameters may be defined within a configuration file that is accessed by the kernel layer 520. In one embodiment, the configuration file includes a plurality of scan policies, each of which is associated with a set of corresponding scan parameters.

In operation, regulator 515 acts a single point of control for managing scan requests, and is configured to receive a plurality of scan requests 505. In particular, the regulator 515 is configured to determine which scan policy to implement for a particular scan request, and when to release the scan request. The scan policy may be associated with the application making the scan request, in one embodiment. In another embodiment, the scan policy may be associated with another application that is currently executing in the foreground of the device. In still another embodiment, the scan policy may be associated with a state of the device, such as implementing a particular scan policy when the device is idle. Also, the regulator 515 is configured to determining the state of the device (e.g., idle, active, etc.) and/or the application (e.g., executing in the foreground or background, high priority, low priority, etc.), and adjust the scan parameters accordingly.

After the scan request is released by the regulator 515, the Wi-Fi driver 525 sets the scan policy in accordance with the request. For a low latency scan policy, Wi-Fi driver 525 will set scan parameters that will perform the scan to satisfy the latency requirements of the application. For example, a passive scan may be broken down into sections in order to satisfy the latency requirements, and an active scan may be implemented in such a manner to satisfy the latency requirements.

The Wi-Fi driver 525 at the kernel layer 520 delivers a scan command to the Wi-Fi chip 535 at the system layer 530. The Wi-Fi chip 535 is configured to execute the scan request according to the scan parameters. For example, the a scan may be executed on a particular channel or set of channels for a certain period or over a number of periods, wherein the radio 537 returns to the home channel for a particular dwell time.

Figure 6:
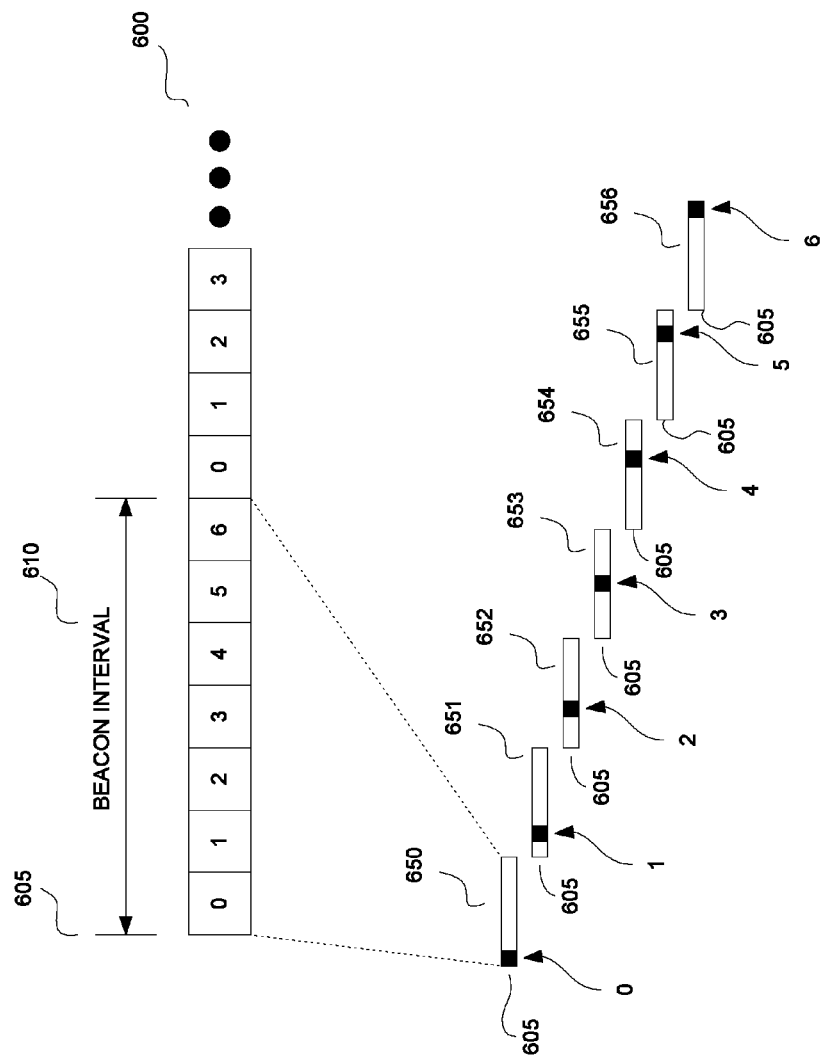
FIG. 6 is an illustration of time shifting various sections of a passive scan sequence when implementing a scan policy, in accordance with one embodiment of the present disclosure.

FIG. 6 is an illustration of time shifting various sections of a passive scan sequence when implementing a scan policy, in accordance with one embodiment of the present disclosure. A full scan sequence 600 for passive scanning may occur over a 3-4 second integral, scanning multiple channels with corresponding beacon intervals. That is, the device listens over a particular channel for the entire beacon interval (e.g., between 100-130 milliseconds[ms]). A latency of 3-4 seconds may be too long for certain applications, and embodiments of the present invention are able to break the beacon interval into short discontinuous windows.

As shown, full scan sequence 600 associated with passive scanning may be partitioned into one or more beacon intervals, each of which correspond to a particular channel or frequency. For example, beacon interval 610 may be associated with a first channel (e.g., 2.4 GHz), wherein at some point in the interval 610, an access point will send a beacon signal allowing listening devices to determine whether or not an access point is on that channel. Further, beacon interval may occur over a duration lasting for example 50 ms, or more.

Embodiments of the present invention are able to partition a beacon interval of a first channel into a plurality of discontinuous timing windows. In one implementation, each timing window includes a corresponding time interval that is less than or equal to a maximum time interval exhibiting acceptable latency when executing an application based on its corresponding Wi-Fi scan policy. That is, the time for a particular window (e.g., 0-6) occurs over a shorter period than the beacon interval 610, with remaining time assigned to the home channel. In that manner, any latency introduced in the executing application during the scan is within tolerance, and the user experience interacting with the application is of a high quality. For example, beacon interval 610 may be broken down into windows 0-6, each of which may be referenced to start time 605 and define a particular dwell time over which the radio tunes to the first channel. The sliding windows 0-6 reduce off-channel (e.g., home channel) radio unavailability.

For example, in a beacon interval occurring over 70 ms, window 0 occurs during 0-10 ms, window 1 occurs during 10-20 ms, window 2 occurs during 20-30 ms, window 3 occurs during 30-40 ms, window 4 occurs during 40-50 ms, window 5 occurs during 50-60 ms, and window 6 occurs during 60-70 ms. In particular, each timing window covers a different time interval over the beacon interval 610 for that channel. As such, instead of listening for the full beacon interval 610 for a potential beacon from an access point, the Wi-Fi radio will listen to the first channel over the various window periods occurring during different continuous or discontinuous beacon interval periods until the entire beacon interval is scanned. Each window occurs over an interval (e.g., 0-10 milliseconds) that is less than the full beacon interval (e.g., 50 milliseconds or more). In that manner, passive scanning is performed over the entire beacon interval 610, but over continuous or discontinuous multiple beacon intervals.

As shown in FIG. 6, seven continuous time periods 650-656 are shown, each of which occurs over a time interval that is equal to the time interval of beacon interval 610. Within time period 650, the Wi-Fi radio is tuned to the first channel for a first timing window 0 to conduct passive scanning. As described previously, timing window 0 occurs at the beginning of a start time 605 of the beacon internal 650, which is associated with the reference beacon interval 610. In the remaining time of interval 650, the radio returns to the home channel for a dwell period to facilitate communication with the device (e.g., from a gaming controller, or from a third party over the internet, etc.). Also, within time period 651, the Wi-Fi radio is tuned to the first channel for timing window 1 to conduct passive scanning. As described previously, timing window 1 occurs at a later time (e.g., 10-20 ms) within the reference beacon interval 610 than timing window 0 (e.g., 0-10 ms). Continuing, within time period 652, the Wi-Fi radio is tuned to the first channel for timing window 2, which occurs at a later time within the reference beacon interval 610 than window 1; within time period 653, the Wi-Fi radio is tuned to the first channel for timing window 3, which occurs at a later time within the reference beacon interval 610 than window 2; within time period 654, the Wi-Fi radio is tuned to the first channel for timing window 4, which occurs at a later time within the reference beacon interval 610 than window 3; within time period 655, the Wi-Fi radio is tuned to the first channel for timing window 5, which occurs at a later time within the reference beacon interval 610 than window 4; and within time period 656, the Wi-Fi radio is tuned to the first channel for timing window 6, which occurs at a later time within the reference beacon interval 610 than window 5.

In one implementation, a first passive scan is conducted from channels 12-79, wherein scanning is repeated thirty-four times for each channel. A 5 ms time period is devoted to the home channel. A second passive scan is conducted from channels 80-139, wherein scanning is repeated thirty-four times for each channel, and a dwell period for the home channel is also 5 ms.

Figure 7:
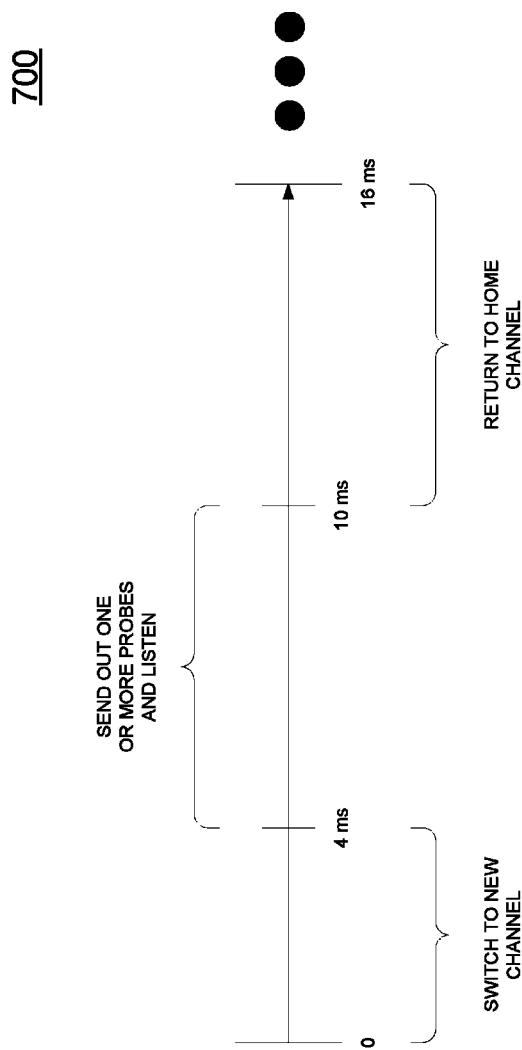
FIG. 7 is an illustration of the reduction of a scanning period when performing an active scan in compliance with a scan policy, in accordance with one embodiment of the present disclosure.

FIG. 7 is an illustration of the reduction of a scanning period when performing an active scan in compliance with a scan policy, in accordance with one embodiment of the present disclosure. In particular, the period over which active scanning occurs is reduced according to the scan policy for a corresponding application is satisfied (e.g., meet latency requirements). The time interval parameter defines a period over which the first device switches to the requisite channel, sends at least one scanning probe, and waits for a response, and sets a dwell time to return to the home channel. The time interval exhibits acceptable latency when executing the application based on its corresponding Wi-Fi scan policy.

As shown in FIG. 7, a 16 ms interval is set for conducting an active scan over a particular channel. The 16 ms interval is less than a full scan sequence for that channel, and possibly other channels, when conducing active scanning. The 16 ms interval exhibits acceptable latency when executing the application based on the corresponding Wi-Fi scan policy. Of course, the 16 ms interval is used for illustration purposes only, and as such the interval may be of any suitable length.

For illustration, it takes about 4 ms to switch to the new channel over which an active scan is performed. The radio may switch from the home channel to a first channel of a list of channels over which active scanning is performed. Between 4 ms and 10 ms in the 16 ms interval, one or more probes are delivered over a short time period. Additionally, the radio is tuned to listen to responses over the 4 ms to 10 ms interval. Between 10 ms and 16 ms, the radio returns to the home channel for a dwell period set in the scan parameters to facilitate communication with the first device.

Typically, one probe is delivered in a scan period, however, embodiments of the present invention can deliver multiple and successive scanning probes to initiate a heuristically increased response from any active access points on that channel. Otherwise, an access point may not respond as quickly when only receiving one probe. That is, multiple scanning probes are delivered in quick succession to trigger a quicker response from any access point listening over the first channel.

In addition, the active scan may scan over a second channel. In that case, the radio switches to the second channel from the home channel. The radio sends at least one scanning probe, wherein a time interval parameter defines a period over which the first device switches to the second channel, sends the at least one scanning probe, waits for a response, and returns to the home channel. The time interval exhibits acceptable latency when executing said application based on said Wi-Fi scan policy Thus, according to embodiments of the present disclosure, systems and methods are described providing for dynamically regulating and controlling Wi-Fi scans made by a device.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples in that many architectural variants can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

What is claimed:

1. A method for discovering wireless access:
launching a first application in association with a first device;
accessing a Wi-Fi scan policy associated with said first application;
setting parameters for implementing a plurality of Wi-Fi scans from said first device based on said Wi-Fi scan policy,
receiving a request for a Wi-Fi scan from a second application;
responsive to determining that said second application is of a first level priority, performing a Wi-Fi scan according to said parameters that are set; and
responsive to determining that said second application is of a second level priority, performing a Wi-Fi scan according to said parameters that are set only after receiving a total number of requests for scans that reach or exceed a threshold.

2. The method of claim 1, further comprising:
setting parameters of said Wi-Fi scan policy upon instantiation of said first application on said first device.

3. The method of claim 1, further comprising:
establishing a peer-to-peer connection over a home channel to facilitate a communication between said first device and a controller device.

4. The method of claim 1, further comprising:
establishing a Wi-Fi connection with an access point over a home channel to facilitate a communication between said first device and a controller device.

5. The method of claim 1, wherein said second application is executing in a foreground when of said first level priority, and wherein said second application is executing in a background when of said second level priority.

6. The method of claim 1, further comprising:
determining a current geo-location of said first device;
determining that said first device has previously connected with a first access point over a first channel at said geo-location; and
sending a request over said first channel to said first access point requesting a connection.

7. The method of claim 6, further comprising:
detecting an user interaction with said first device after a threshold period of non-interaction; and performing a Wi-Fi scan according to said parameters that are set.

8. The method of claim 7, wherein said detecting said user interaction comprises:
detecting a motion of said first device.

9. A method for discovering wireless access, the method comprising:
launching a first application in association with a first device;
accessing a Wi-Fi scan policy associated with said first application;
setting parameters for implementing a plurality of Wi-Fi scans from said first device based on said Wi-Fi scan policy;
partitioning a beacon interval of a first channel into a plurality of discontinuous timing windows, wherein each timing window of said plurality of discontinuous timing windows comprises a corresponding time interval that is less than or equal to a maximum time interval exhibiting acceptable latency when executing said first application based on said Wi-Fi scan policy, and wherein said timing window covers a different time interval over said beacon interval;
with reference to a start time, passively scanning said first channel over a first timing window of said plurality of discontinuous timing windows;
returning to a home channel for a dwell period to facilitate communication with said first device; and
with reference to said start time, passively scanning said first channel over a second timing window of said plurality of discontinuous timing windows.

10. A method for discovering wireless access, the method comprising:
launching a first application in association with a first device;
accessing a Wi-Fi scan policy associated with said first application;
setting parameters for implementing a plurality of Wi-Fi scans from said first device based on said Wi-Fi scan policy,
for a first channel of a predefined list of channels to be scanned, switching to said first channel from a home channel;
sending at least one scanning probe, wherein a time interval parameter defines a period over which said first device switches to said first channel, sends said at least one scanning probe, and waits for a response, wherein said time interval exhibits acceptable latency when executing said first application based on said Wi-Fi scan policy; and
returning to said home channel for a dwell period to facilitate communication with said first device.

11. The method of claim 10, wherein said sending at least one scanning probe comprises:
sending multiple scanning probes in one scan period in succession to trigger a response from any access point listening over said first channel.

12. The method of claim 10, further comprising:
switching to a second channel from said home channel;
sending at least one scanning probe, wherein said time interval parameter defines said period over which said first device switches to said second channel, sends said at least one scanning probe, and waits for a second response, wherein said period exhibits acceptable latency when executing said first application based on said Wi-Fi scan policy; and
returning to said home channel for said dwell period to facilitate communication with said first device.

13. A computer system comprising:
a processor; and
memory coupled to said processor and having stored therein instructions that, if executed by said computer system, cause said computer system to execute a method for discovering wireless access comprising:
launching a first application in association with a first device;
accessing a Wi-Fi scan policy associated with said first application;
setting parameters for implementing a plurality of Wi-Fi scans from said first device based on said Wi-Fi scan policy;
receiving a request for a Wi-Fi scan from a second application;
responsive to determining that said second application is of a first level priority, performing a Wi-Fi scan according to said parameters that are set; and
responsive to determining that said second application is of a second level priority, performing a Wi-Fi scan according to said parameters that are set only after receiving a total number of requests for scans that reach or exceed a threshold.

14. The computer system of claim 13, wherein said method further comprises:
partitioning a beacon interval of a first channel into a plurality of discontinuous timing windows, wherein each timing window of said plurality of discontinuous timing windows comprises a corresponding time interval that is less than or equal to a maximum time interval exhibiting acceptable latency when executing said first application based on said Wi-Fi scan policy, and wherein each timing window of said plurality of discontinuous timing windows covers a different time interval over said beacon interval;
with reference to a start time, passively scanning said first channel over a first timing window of said plurality of discontinuous timing windows;
returning to a home channel for a dwell period to facilitate communication with said first device; and
with reference to said start time, passively scanning said first channel over a second timing window of said plurality of discontinuous timing windows.

15. The computer system of claim 13, wherein said method further comprises:
for a first channel of a predefined list of channels to be scanned, switching to said first channel from a home channel;
sending at least one scanning probe, wherein a time interval parameter defines a period over which said first device switches to said first channel, sends said at least one scanning probe, and waits for a response, wherein said period exhibits acceptable latency when executing said application based on said Wi-Fi scan policy; and
returning to said home channel for a dwell period to facilitate communication with said first device.

16. A non-transitory computer-readable medium having computer-executable instructions for causing a computer system to perform a method for discovering wireless access comprising:
launching an application in association with a first device;
accessing a Wi-Fi scan policy associated with said application;

setting parameters for implementing a plurality of Wi-Fi scans from said first device based on said Wi-Fi scan policy;

receiving a request for a Wi-Fi scan from a second application;

responsive to determining that said second application is of a first level priority, performing a Wi-Fi scan according to said parameters that are set; and responsive to determining that said second application is of a second level priority, performing a Wi-Fi scan according to said parameters that are set only after receiving a total number of requests for scans that reach or exceed a threshold.

17. The non-transitory computer-readable medium of claim 16, wherein said method further comprises:

partitioning a beacon interval of a first channel into a plurality of discontinuous timing windows, wherein each timing window of said plurality of discontinuous timing windows comprises a corresponding time interval that is less than or equal to a maximum time interval exhibiting acceptable latency when executing said application based on said Wi-Fi scan policy, and wherein said timing window covers a different time interval over said beacon interval;

with reference to a start time, passively scanning said first channel over a first timing window of said plurality of discontinuous timing windows;

returning to a home channel for a dwell period to facilitate communication with said first device; and with reference to said start time, passively scanning said first channel over a second timing window of said plurality of discontinuous timing windows.

18. The non-transitory computer-readable medium of claim 16, wherein said method further comprises:

for a first channel of a predefined list of channels to be scanned, switching to said first channel from a home channel;

sending at least one scanning probe, wherein a time interval parameter defines a period over which said first device switches to said first channel, sends said at least one scanning probe, and waits for a response, wherein said period exhibits acceptable latency when executing said application based on said Wi-Fi scan policy; and returning to said home channel for a dwell period to facilitate communication with said first device.

* * * * *